United States Patent
Sonnendorfer

(10) Patent No.: US 8,557,317 B2
(45) Date of Patent: Oct. 15, 2013

(54) DEVICE FOR DETECTING THE INTERNAL TEMPERATURE OF A FOODSTUFF

(75) Inventor: Horst Sonnendorfer, Puchheim (DE)

(73) Assignee: Tecpoint GmbH, Wolfratschausen (DE)

( * ) Notice: Subject to any disclaimer, the term of this patent is extended or adjusted under 35 U.S.C. 154(b) by 0 days.

(21) Appl. No.: 13/469,520

(22) Filed: May 11, 2012

(65) Prior Publication Data

US 2012/0225170 A1   Sep. 6, 2012

Related U.S. Application Data

(63) Continuation of application No. 13/407,986, filed on Feb. 29, 2012.

(60) Provisional application No. 61/475,412, filed on Apr. 14, 2011.

(30) Foreign Application Priority Data

Mar. 4, 2011 (DE) .......................... 20 2011 003 569

(51) Int. Cl.
*F24C 7/08*   (2006.01)

(52) U.S. Cl.
USPC ........... 426/231; 426/233; 426/523; 219/494; 219/712; 374/E7.001

(58) Field of Classification Search
USPC ................. 426/231, 230, 233, 523; 374/100, 374/E7.001; 99/341–344; 219/494, 712
See application file for complete search history.

(56) References Cited

U.S. PATENT DOCUMENTS 5,215,000 A * 6/1993 Desage et al. .................. 99/331
6,299,921 B1 * 10/2001 Loffler et al. ................. 426/233

(Continued)

FOREIGN PATENT DOCUMENTS

DE         4421373 A1   12/1995
DE     202006004171 U1    7/2006

(Continued)

OTHER PUBLICATIONS

An International Search Report mailed Jun. 28, 2012, which issued in corresponding International Application No. PCT/EP2012/000900.

(Continued)

*Primary Examiner* — Steven Leff
(74) *Attorney, Agent, or Firm* — Fish & Richardson P.C.

(57) ABSTRACT

The invention relates to a device 1 for detecting the internal temperature of a foodstuff 2, with at least one temperature sensor 3 that is arranged in a first housing section 4, which can be inserted into the foodstuff 2 for the measurement, while a second housing section 10 protrudes from the foodstuff 2. The autonomous device further comprises a voltage source 7, an electronic analyzing unit 6 for checking at least one predetermined temperature condition, and a temperature indicator 8. For precise, especially continuous measuring of the internal temperature of the foodstuff 2 during the preparation, in particular during a grilling process, the first housing section 4 is designed to remain within the foodstuff 2, and for this purpose, at least the analyzing unit 6 and the temperature indicator 8 are arranged in the first housing section 4, and the second housing section 10 is designed so that information shown by the analyzing unit 6 on the temperature indicator 8 can be perceived. The invention further relates to a method of preparing a foodstuff by a cooking process, in particular a grilling process.

25 Claims, 3 Drawing Sheets

(56) References Cited

U.S. PATENT DOCUMENTS

| | | | |
|---|---|---|---|
| 6,539,842 B1 * | 4/2003 | Chapman et al. | 99/342 |
| 7,201,099 B2 * | 4/2007 | Harris et al. | 99/342 |
| 7,703,389 B2 * | 4/2010 | McLemore et al. | 99/413 |
| 2005/0012627 A1 * | 1/2005 | Lion et al. | 340/584 |
| 2005/0201445 A1 | 9/2005 | Harris et al. | |
| 2006/0013933 A1 * | 1/2006 | Fink et al. | 426/523 |
| 2006/0220887 A1 * | 10/2006 | Lion et al. | 340/584 |
| 2008/0043809 A1 * | 2/2008 | Herbert | 374/163 |
| 2010/0012645 A1 | 1/2010 | Baier | |

FOREIGN PATENT DOCUMENTS

| | | |
|---|---|---|
| DE | 102007018245 A1 | 10/2008 |
| DE | 102009047418 A1 | 6/2011 |
| WO | WO2008051148 A1 | 5/2008 |
| WO | WO2010023237 A1 | 3/2010 |

OTHER PUBLICATIONS

German Search Report mailed Nov. 16, 2011, which issued in corresponding German Application No. 202011003569.7.

* cited by examiner

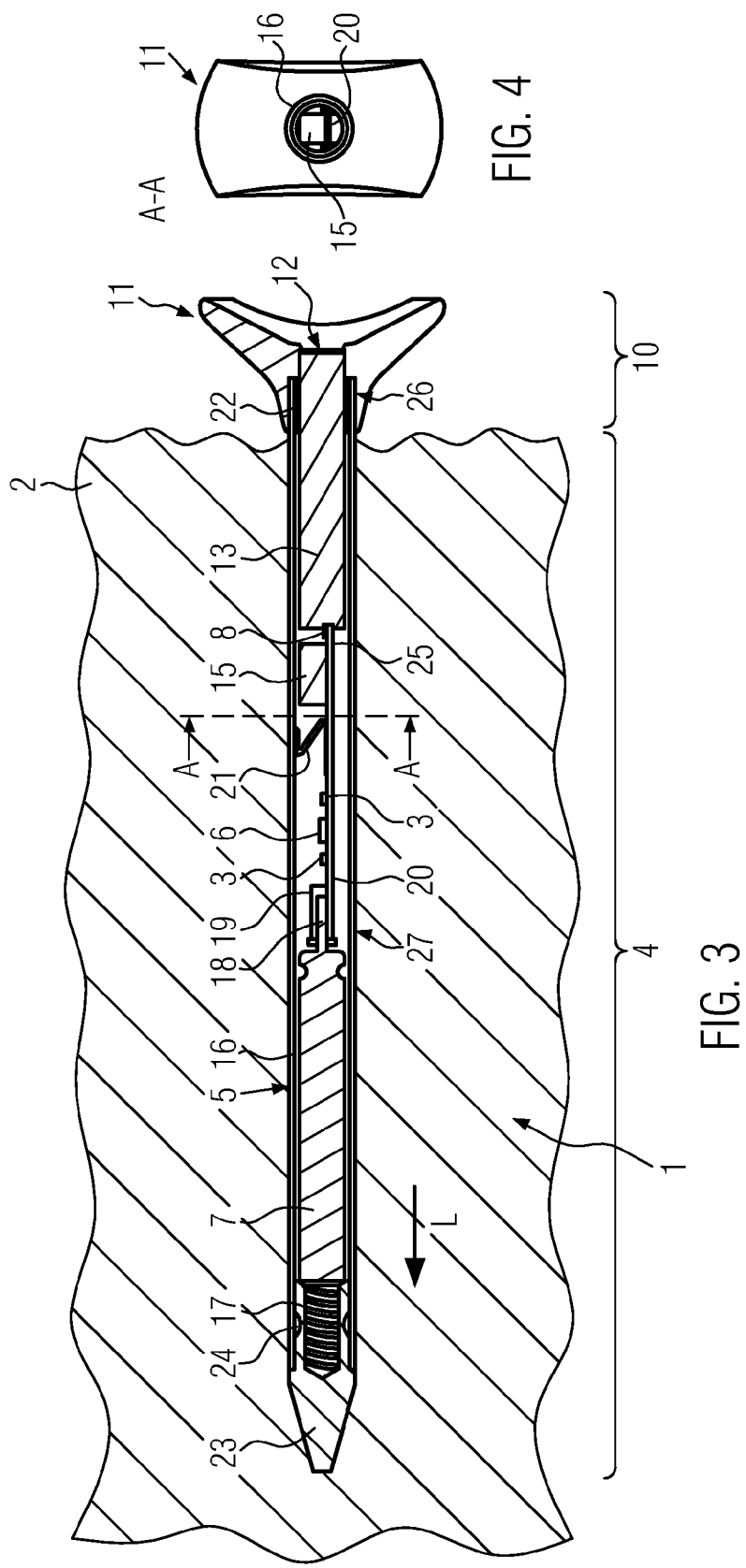

DEVICE FOR DETECTING THE INTERNAL TEMPERATURE OF A FOODSTUFF

BACKGROUND OF THE INVENTION

The invention relates to a device for detecting the internal temperature of a foodstuff, in particular a device for detecting a degree of doneness of a piece of meat to be prepared, according to the overarching concept of claim 1. The invention further relates to a method of preparing a foodstuff by a cooking process, in particular a grilling process.

When foodstuffs are cooked, the temperature and the length of the preparation are usually determined by the type of foodstuff and the desired final degree of doneness. In fish, usually a short preparation time suffices; for example, if you want to cook tuna lightly pink. In turn, for lamb and beef, there is a wide range of possible preparation, or the desired final degree of doneness. For example, for beef steaks, the desired final degree of doneness is called by the names "Blue Rare", "Rare", "Medium Rare", "Medium", "Medium Well", and "Well Done", the most common method of preparation being "Medium Rare". Since steaks usually have a certain minimum thickness, namely preferably at least 2.5 cm (1 inch), better 3.8 cm (1.5 inches) or even better 5 cm (2 inches), it is often difficult to judge the doneness in the inside of the steak, because even a slight deviation with respect to the temperature of heating or duration of cooking may substantially change the final degree of doneness. In contrast, with other kinds of meat, for example chicken, pork or mutton, usually a thorough and complete cooking is desired. Should the pieces to be prepared also exceed a certain thickness, it is difficult to verify whether the inside of the pieces is already thoroughly cooked, or should be heated for an additional time.

Temperature-measuring devices for determining the temperature inside a food product are known in various designs. For example, the generic DE 20 2006 004 171 U1 discloses a testing device for determining the edibility of a food product, having a temperature-sensitive measuring probe, which is inserted into a food product, where several measuring sensors are arranged along the measuring probe such that the temperature values can be determined at various positions in the food. At the end of the measuring probe, there is provided a housing, which evaluates the sensor signals, and indicates by means of light-emitting diodes, whether all temperature values that were determined by the measurement sensors are above a set point.

This testing device cannot remain in the food during cooking, because the electronics arranged in the housing are sensitive to temperature. For each testing procedure, the testing device needs to be inserted into the food, for which the food must be removed from the grill, from the pan or the oven.

Since this is cumbersome, this testing device is suitable only for the purpose described, namely, for checking whether a food product is thoroughly cooked, but not for the determination of a more defined cooking state, e.g., only partial cooking of the food.

Furthermore, in the prior art, ovens are known that are equipped with a sensing element in the cooking chamber, which can be inserted into a food product and then controls heating of the oven as a function of the temperature in the core area of the food. DE 44 21 373 A1 discloses such an oven with a sensing element, whose electronic components are mounted in the tip, which is to prevent overheating of the electronic components. DE 44 21 373 A1 further discloses that the sensing element allows wireless transmission of the temperature signal, wherein for this purpose, alternatively, a radio transmitter, ultrasonic transmitter or optical transmitter is provided. However, the sensing element can only be operated with the oven, since the temperature signal is analyzed by the oven, and is not readable at the sensing element itself.

Furthermore, in the prior art, there are known still mechanically operating measuring devices, which, it is true, have a sufficient thermal resistance to remain in place in the foodstuff during the preparation. However, they are not accurate or sufficiently discriminating to allow the preparation of a foodstuff towards a well-defined degree of doneness. The precision of the temperature-measurement sensor and the exact indication of achieving at least one degree of doneness are crucial for the result of preparation, i.e., the final degree of doneness.

The underlying task of the invention is thus to provide a versatile device of the initially indicated type, which operates autonomously, i.e., without additional equipment, and reports the achieving of a foodstuff's precise doneness.

BRIEF SUMMARY OF THE INVENTION

According to the invention, a device for detecting the internal temperature of a foodstuff is provided, with at least one temperature sensor, which is arranged in a first housing section that can be inserted into the food for the measurement, while a second housing section protrudes from the foodstuff, and with a voltage source, an electronic analyzing unit to verify at least one predetermined temperature condition, and a temperature indicator; said device being autonomous, and wherein for precise, especially continuous measuring of the internal temperature of the foodstuff during preparation, particularly during a grilling process, the first housing section is designed so as to remain within the foodstuff, and for this purpose at least the analyzing unit and the temperature indicator are arranged in the first housing section, and the second housing section is designed so that information provided by the analyzing unit through its temperature indicator is perceptible.

The temperature indicator can display the information, in particular at least one temperature condition, visibly, audibly, by touch, or in a combination thereof.

In particular, the information on the temperature indicator is displayed in a visible fashion. Advantageous is a combination of acoustic and optical signals.

The use of an electronic analyzing unit, in particular a microcontroller, to analyze the sensor allows for precise detection and analysis and a discriminating representation of the temperature condition. This primarily continuous measuring refers to, for example, a digital analysis of an analog sensor signal with standard sampling intervals.

Since the electronic analyzing unit and the temperature indicator are arranged in the first housing section, which during the preparation remains within the foodstuff, the foodstuff acts as insulation and prevents overheating of these sensitive components.

When preparing a piece of beef, the target temperatures within the foodstuff are at about 50 to 75 degrees Celsius, with a few degrees difference in temperature being critical for the success of preparation. This is especially true for preparation by grilling, frying, roasting, cooking food in an oven, in a pan or on a grill.

Since the device is autonomous, it can be used alone and in many ways, it being nevertheless possible to measure the internal temperature of the foodstuff continuously and accurately. All that is needed for the preparation of a foodstuff is a heat source and the inventive device that requires no accessories or adaptation to the heat source.

The second housing section has in particular a viewing window, a transparent or translucent section or an opening, through which the temperature indicator output information from the analyzing unit is visible. In other embodiments, the second housing section for reporting the information can be designed so that, for example, it changes its color, flashes, buzzes, vibrates, plays a tune or something similar.

The temperature indicator can indicate in particular various operating states and degrees of doneness. Thus, the temperature indicator can display in particular the states "turned on," "below the set temperature," "small distance to the target temperature," "achieving or exceeding the target temperature," and/or "reaching the serving temperature."

The first housing section is mainly elongated and may have a tip so that it can be inserted into the foodstuff for the measurement. In contrast, the second housing section can comprise a grip, i.e., in particular, a widened area of the housing, which can be easily grasped and forms a stop at the full insertion into the foodstuff so that easy insertion into the food and removal from it are possible.

In one embodiment of the invention, the temperature sensor is arranged such that an integral temperature measurement is carried out over at least a part of the first housing section. In the prior art, temperature sensors are often known that are arranged directly at the tip of a needle-like part of the device, or directly on the inner wall of the needle-shaped section of the device. This, however, allows detecting the temperature accurately only in a narrow area so that the measurement results could be distorted by locally differing temperatures. Therefore, also known in the prior art is the distribution of several sensors along the length of a needle-like housing section and the analysis of the individual temperature measurements together. However, this requires a considerably more complex design and analysis. In contrast, the integral temperature measurement allows a more reliable measurement over an area of the first housing section with only one temperature sensor arranged at one point. The integral temperature measurement can be made possible, for example, in that a highly heat-conducting material, such as copper, is provided between the temperature sensor and the housing so that the temperatures in the wide measuring field of the heat-conductive material are fed to the sensor.

In one embodiment, the temperature sensor may be at some distance from the inside of the first housing section. The spacing in turn causes the temperature values at a larger area of the housing to be considered, because the ratio of the distances between the sensor and the nearest point of the housing, and the sensor and a more distant point of the housing becomes larger.

Advantageously, a cavity is provided between the at least one temperature sensor and the inside of the first housing section. The cavity causes the temperature transfer from the first housing section to the sensor to be slowed down so that any temporary and local temperature peaks are averaged out, and a reliable, smoothed and integral temperature measurement is carried out over a larger area.

Advantageously, a status indicator for displaying the information from the temperature indicator is arranged on the second housing section and remains outside of the foodstuff during preparation. The status indicator can be formed in particular by an opening, a window or light scattering element, which either opens the temperature indicator to view, or reports the signal from the temperature indicator to the outside.

Advantageously, the status indicator can be a transparent or translucent zone of the second housing section. If the second housing section is made of metal, for example, a partially cloudy or a clear glass body that forms the status indicator can be provided in a certain area.

In particular, several status indicators at a certain distance from each other can be provided on the second housing section, or the second housing section can be designed to be wholly transparent or translucent and thus form the status indicator.

The first housing section and the second housing section can be part of an integral housing. Alternatively, the housing can also consist of several housing parts, wherein their boundaries are mainly independent of the definition of the first and second housing sections.

In one embodiment, the temperature indicator and status indicator are optically connected to each other by one or more light conductors, in particular by a glass line or a fiberglass line. This can ensure an efficient transmission of the output signal from the temperature indicator to the status indicator. A plurality of light conductors are in particular provided when the temperature indicator comprises a plurality of light sources that emit different signals independently, for example, differently colored light signals, which are then routed to one or more status indicators.

Advantageously, the analyzing unit is designed to monitor a temperature in dependence on the temperature gradient and/or the temperature in order to determine a degree of doneness. In the simplest variant, the analyzing unit monitors whether a temperature limit is exceeded. After the temperature depending on the heating power increases in the foodstuff at different rates, it may also be advantageous, in addition to temperature, to also determine the temporal temperature gradient in order to determine how quickly the foodstuff is being heated. In particular, during a rapid heating of the piece of meat, outer regions can have a considerably higher temperature than the inner region so that the internal temperature still continues to rise even after heating the foodstuff (the so-called resting period). A high temporal temperature gradient is an indicator for such a rapid heating. In particular, the temperature condition may be the exceeding of a limiting value by a weighted sum of the temporal temperature gradient and temperature, wherein upon exceeding the limiting value, it is determined that a defined degree of doneness is achieved, or is achieved in the subsequent resting period. When several temperature sensors are used in the device, a spatial temperature gradient can also be determined, which allows conclusions to be drawn as to how uniformly the foodstuff was heated.

In one embodiment, the device is designed to have the temperature indicator display the reaching of a first temperature condition, and further the subsequent reaching of a second temperature condition or a time condition, whereby in particular a monitoring of the resting period is made possible. Since the foodstuff is usually heated from the outside, there exists a temperature gradient from the outer regions of the foodstuff to inner regions. The temperature equilibration by conduction within the foodstuff after the end of the heating means that the temperature in the outer regions of the foodstuff rather decreases while the temperature in the inner region slightly increases.

The achievement of the ideal consumption temperature in the resting period can be determined by monitoring the achievement of a second temperature condition. This can be for example a target temperature. Alternatively, the second temperature condition can be that the temporal temperature gradient is zero, i.e., that there is no longer any further increase in temperature, whereby it is determined that the maximum temperature is reached in the interior of the foodstuff. Furthermore, a time condition can be given, for example, a minimum and/or maximum time for the resting period.

In particular, the temperature value of the second temperature condition is higher than the temperature value of the first temperature condition. This is, as already described above, due to the fact that equilibration of the inhomogeneous temperature distribution takes place after the end of the heat supply, whereby the temperature value in the interior of the foodstuff slightly rises.

In one embodiment, the temperature indicator can show different degrees of doneness by means of different colors and/or flashing signals. The term "degree of doneness" does not necessarily refer to the desired final degree of doneness, which characterizes the state in which the foodstuff is to be served. Thus, a degree of doneness can be defined, for example, as an interim degree of doneness present during the preparation. For example, prior to reaching an interim degree of doneness with a desired temperature, especially calculated over a certain temperature interval to the desired temperature, or calculated over the temperature gradient and the temperature, an interim degree of doneness is defined, from which point on a warning signal is displayed that shows the soon-to-be-reached subsequent degree of doneness. Further, a possible interim degree of doneness can be, for example, the achievement of a state, in which the food should no longer be heated. A state, in which the food has reached full doneness after the resting period and thus is ready for consumption, is commonly defined as final degree of doneness. The different degrees of doneness can be displayed in particular by means of different colored lights on the temperature indicator that may be transmitted by multiple optical fibers to several status indicators. Alternatively, several different colored lights on the temperature indicator can also be transmitted by an optical fiber to a status indicator, or can be perceived, in particular be visible, without an optical fiber by a status indicator. In other embodiments, in addition or alternatively, the achievement of various degrees of doneness can be indicated by different flashing signals, wherein in particular the frequency of the flashing signal changes.

Thus, the switching-on of the device can be signaled by a brief rapid flashing, for example, three brief rapid flashes. During the measurement, the operating mode of the device can be signaled by a slow flashing, for example, by a flash every two to ten seconds. Upon reaching a pre-warning temperature condition, for example, upon reaching a specified temperature, the frequency of the flashing sign can be increased, for example, to a flashing sign every 1.5 seconds. The latter flashes can be either a single flash or a periodic multiple flashes in quick succession, such as a double flash.

Once the temperature condition with respect to the termination of the heat supply is achieved, a high-frequency flashing signal is emitted, for example, more than one flash per second, in particular a flash every 0.66 seconds. The flashes will be maintained either until the end of the resting period, or an additional slightly slower flash will be displayed during the resting period. The reaching of the target temperature is indicated by a further short fast flash, or by the end of the flashing signal.

Accordingly, the different degrees of doneness can be displayed by sequentially displaying various colors.

Usually, the analyzing unit is in a so-called "deep sleep" mode, i.e., with minimum power consumption, only the operation of a switch or other switch-on element is monitored before the analyzing unit is activated and passes into an operating state.

In one embodiment, at least the analyzing unit can be activated by the heating of the first housing part. This is for example possible by the fact that a temperature-activated switch is provided, which activates the analyzing unit. This can be a secondary function of the temperature sensor; in other embodiments, however, there may also be provided a separately arranged temperature switch, which enables low power consumption, such as for example a bimetal switch. Alternatively, the analyzing unit can be activated by inserting the first housing part into the foodstuff.

In an alternative embodiment, at least the analyzing unit can be activated by moving or rotating the second housing part with respect to the first housing part. In particular, the displacement or rotation can cause an intervention with a switch or can close an electrical contact. Furthermore, it is possible that by pressure at the insertion of the first housing part into the foodstuff, the second housing part is moved with respect to the first housing part so that activation is effected automatically.

In another alternative embodiment, at least the analyzing unit can be activated by a magnet. In particular, a reed relay is provided for this purpose, which closes or opens an electrical contact when subjected to a magnetic field.

In still other embodiments, the device comprises two electrically conductive spaced areas on the first housing section, and can be activated by the bridging of these areas by means of the conductivity of the foodstuff. Here, in particular the electrical resistance between two mutually electrically insulated housing areas is determined, which is reduced by the conductivity of the foodstuff upon insertion of the first housing part into the foodstuff.

In particular, the areas of the first housing section, which are designed to be made of metal, are separated from each other by an insulating element. The insulating element may be, for example, an electrically insulating short housing section in the longitudinal direction, which extends around the entire circumference of the first housing part. Furthermore, for example, the tip of the first housing section may be separated from the rest of the first housing section by an insulating element.

In another embodiment, an opening may be provided in the first housing section, in which an insulating element with a central electrode is arranged, wherein the electrical resistance between the central electrode and the remaining first housing section is determined. In all cases, the housing areas spaced apart from one another are supplied with a control voltage such that the electrical bridging of the housing areas by the foodstuff can be determined, and then the analyzing unit is activated in order to initiate the operation of the device.

Advantageously, the second housing section has, at least in one direction orthogonally to the longitudinal main direction of extension of the first housing section, a greater width than the first housing section. Thus, the second housing section forms at least in some areas a grip, which allows inserting the first housing section into the foodstuff and removing it. The grip can form a stop for the full insertion of the first housing section into the foodstuff. Advantageously, the second housing section has two parallel formed opposite end edges. These end edges could be used to indicate the minimum thickness of a steak by arranging the second housing section with the end edges parallel to the top and bottom sides of the steak.

The status indicator can be arranged in a concave depression of the grip in order to protect it from meat juice, heat, grease or oil.

In one embodiment, the device is divisible. The divisibility can be achieved in particular by a predetermined breaking point or by releasable connections. The divisibility enables in particular the removal of the power source or its replacement.

Advantageously, the temperature indicator comprises at least one LED or other optoelectronic display element as illuminants.

In particular, the analyzing unit and the temperature indicator are arranged on a common printed circuit board. This circuit board can further also comprise the temperature sensor. This allows a compact and reliable design of the electrical circuitry of the device.

Advantageously, at least the second housing section is made of a heat-resistant, especially a fireproof and/or food-grade material, mainly metal, especially stainless steel or a titanium alloy. Furthermore, also the first housing section can at least partially be formed of such a material.

In addition to the optical temperature indicator, there can also be provided an acoustic and/or mechanical signal transmitter in order to notify the operator of the device in acoustic and/or haptic manner of the attainment of a predetermined temperature condition, wherein the signal transmitter reports the meeting of a predetermined temperature condition, e.g., by beeping, buzzing, vibrating, flashing, or by a combination of such signals.

In one embodiment, the at least one predetermined temperature condition can be set up in the analyzing unit. In particular, various final degrees of doneness can be selected. This can be done, for example, by actuating a switch that switches cyclically between different temperature conditions, or different housing sections of the device can be rotated in relation to each other in order to activate the desired predetermined temperature conditions.

According to the invention, there is further provided a method for preparing a foodstuff by a cooking process, in particular a grilling process. First, an autonomous temperature sensing device is inserted into the foodstuff so that a first housing section is arranged within the foodstuff, wherein at least a temperature sensor, an analyzing unit, and a temperature indicator are arranged in the first housing section, while a second housing section protrudes from the foodstuff. In a subsequent step, the internal temperature of the foodstuff is precisely, especially continuously, measured by the device during the preparation, in particular during a grilling process, for which purpose the first housing section remains within the foodstuff. At least one temperature condition is checked by the analyzing unit and the relevant information is sent from the analyzing unit to the temperature indicator, wherein the information is perceptible, especially visible, on the second housing section.

Advantageously, only the second housing section, which is widened with respect to the first housing section, will remain outside of the foodstuff. The second housing section is formed in particular as a grip. By its shape, the second housing section forms a stop, when the first housing section is fully inserted into the foodstuff.

In one embodiment, it is determined from the temperature condition in dependence on the temperature gradient and/or the temperature, whether a desired degree of doneness is reached. Specifically, the temperature is measured at a plurality of discrete points in time or continuously, wherein the temperature condition can be either the comparison of the temperature with a temperature limit, or it can also take into account the temperature gradient, which can be calculated from the current and previous temperature values.

In one embodiment, various degrees of doneness can be displayed by means of different colors and/or by means of different flashing speeds of the temperature indicator.

In one embodiment, the device is activated by the heating of the first housing part. For this purpose, for example, an electrical contact can be provided in the device, which closes when heated by the deflection of a bimetallic element.

In other embodiments, the device can be activated by moving or rotating the second housing part with respect to the first housing part.

Furthermore, the device can be activated by a magnet, in particular by removing the device from a storage holder equipped with a magnet.

Finally, the device can be activated by electrical bridging of two spaced electrically conductive housing zones on the first housing section by means of the conductivity of the foodstuff.

In particular, the achievement of a predetermined temperature condition with respect to the foodstuff is signaled to the operator of the device by acoustic and/or mechanical means e.g., by beeping, ringing, whistling, buzzing, vibrating and/or flashing, or by a combination of signals.

The present invention further provides a device for detecting the internal temperature of a foodstuff during preparation, especially during a grilling process, by a temperature sensor, which is arranged in the front end of a housing, which can be arranged within the foodstuff during the preparation, as well as by a control and/or analyzing unit and a temperature indicator, wherein the temperature indicator, together with the control and/or analyzing unit as electronic components are located within the front, first housing section, which remains within the foodstuff during the preparation, wherein the foodstuff acts as insulation, in particular for the electronic components, and the temperature indicator is connected with a temperature-resistant status indicator that signals the internal temperature of the foodstuff and is arranged at the rear, second housing section, and that remains outside of the foodstuff during the preparation.

The inventive device includes in a front housing section not only the temperature sensor, but also a control and/or analyzing unit and temperature indicator. The control and/or analyzing unit can be used to pre-set a target temperature or a desired temperature range, which is then shown by the temperature indicator. The latter is connected with a status indicator, which is preferably located on the outer, free housing section and there not only signals the "on" or "off" operating status, but for example also the internal temperature of the foodstuff during the preparation.

The inventive device can remain in the foodstuff during preparation, while the rear housing section protrudes from the foodstuff and communicates, by the status indicator, the measure of the internal temperature of the foodstuff. Since the status indicator is arranged in the rear housing section, it should be temperature resistant. According to a further development, this also applies at least to the rear housing section.

For the operation of the sensor and/or the temperature indicator and/or the status indicator and/or control unit and/or the analyzing unit, there is advantageously provided a voltage source, which can also be arranged in the front housing section. Conventional batteries can be used as a voltage source. In order to allow replacement and/or maintenance of these components, the housing may be divisible.

In order to be able to insert the device or its housing into the foodstuff easily, it is advantageous if the housing is formed as an elongated, especially unround body, for example, in a knife-like manner. The electrical/electronic components can be located in the area of the knife tip. The rear housing end can be equipped with a grip both for inserting the device into the foodstuff and for removing it, or generally for handling. It is there, where the status indicator may also be arranged. This can be optically connected to the temperature indicator by one or more optical fibers, for example, a glass conductor. The latter may be an LED or other opto-electronic display.

In order to facilitate the retention of the inventive device in the area of the preparation, that is, within an oven or within the cookware or on a grill, it is advantageous if at least the rear housing end is made of a fireproof material, in particular titanium. If the housing is split, then the separation point may be designed as insulated to prevent, or at least reduce, heat transfer from the rear housing to the front housing section.

The housing may be designed as an elongated, for example rotationally symmetrical, body. Also possible are unround cross-sections, e.g., the shape of an oval or a flat rectangle.

The inventive device may be provided with an unspecified switch to determine the operating state of the device. With an unround cross-section, the switch may be arranged at a separation point of a front housing section to the rear housing section, wherein upon switching the device, the housing sections pivot against each other and the unround cross-section of a housing section provides a certain resistance, which facilitates the switching.

A switch could also be realized in that the housing is collapsible into itself or can be pulled apart and the change in distance is used for switching the device. The just described switching movements can also be used for setting the target temperature.

BRIEF DESCRIPTION OF THE DRAWINGS

The invention is described below with reference to a drawing. In the drawing:

FIG. 3 shows a side sectional view of a second embodiment of the inventive device, and FIG. 4 shows a sectional view through the section plane A-A as shown in FIG. 3.

DETAILED DESCRIPTION OF THE INVENTION

Figure 2:
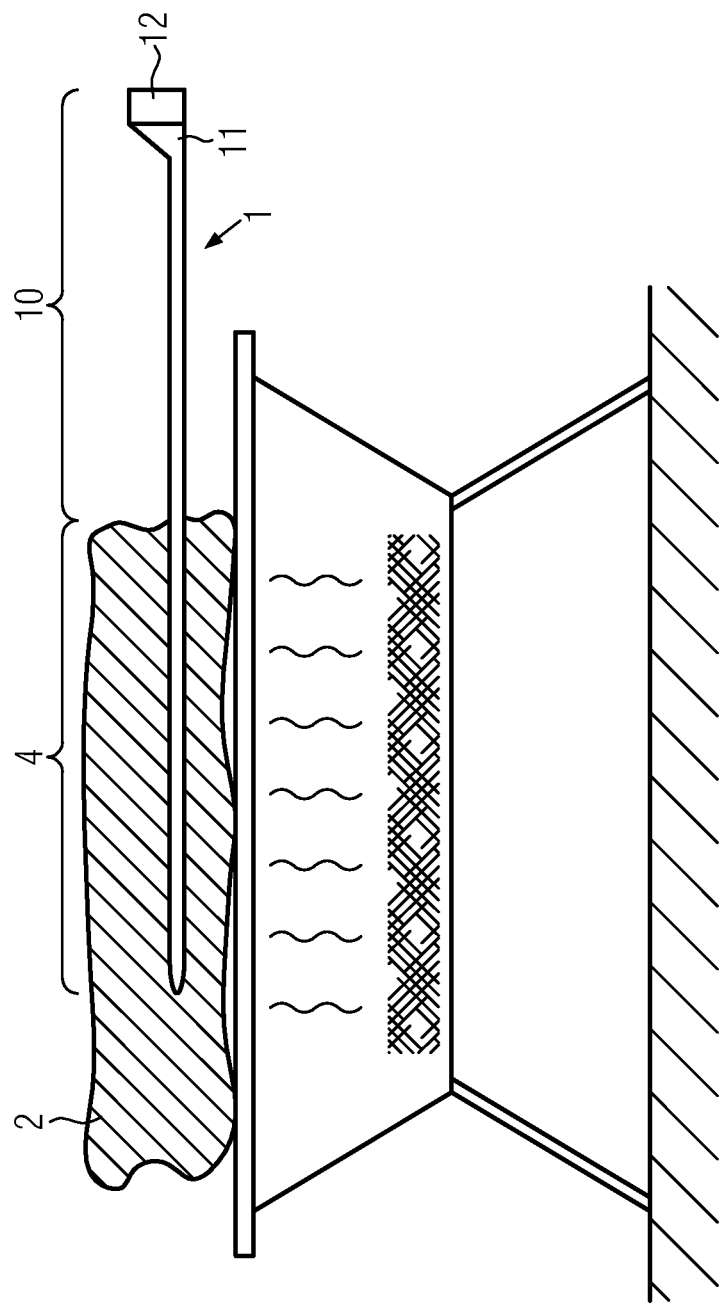
FIG. 2 shows a schematic side view of the device of FIG. 1, which is introduced into a foodstuff located on a charcoal grill

The inventive device 1 is used for detecting the internal temperature of a foodstuff 2 during the preparation, in particular during a grilling process, which is shown for example in FIG. 2.

A temperature sensor 3 is arranged in a front, first section 4 of a housing 5. In this front housing section 4, there is also located a control and/or analyzing unit 6, a voltage source 7 in the form of a battery and a temperature indicator 8. The sensor, the control and/or analyzing unit and the temperature indicator are preferably formed as electrical/electronic components, which are supplied by the voltage source 7.

The components are connected to each other by supply and data lines not shown; a design as a board or chip is feasible.

The lines are—like the aforementioned components—preferably located within the front housing section 4, which during the preparation of the foodstuff remains within it. Here again, it is advantageous that during preparation, the foodstuff acts as insulation for these components and for the lines.

Figure 1:
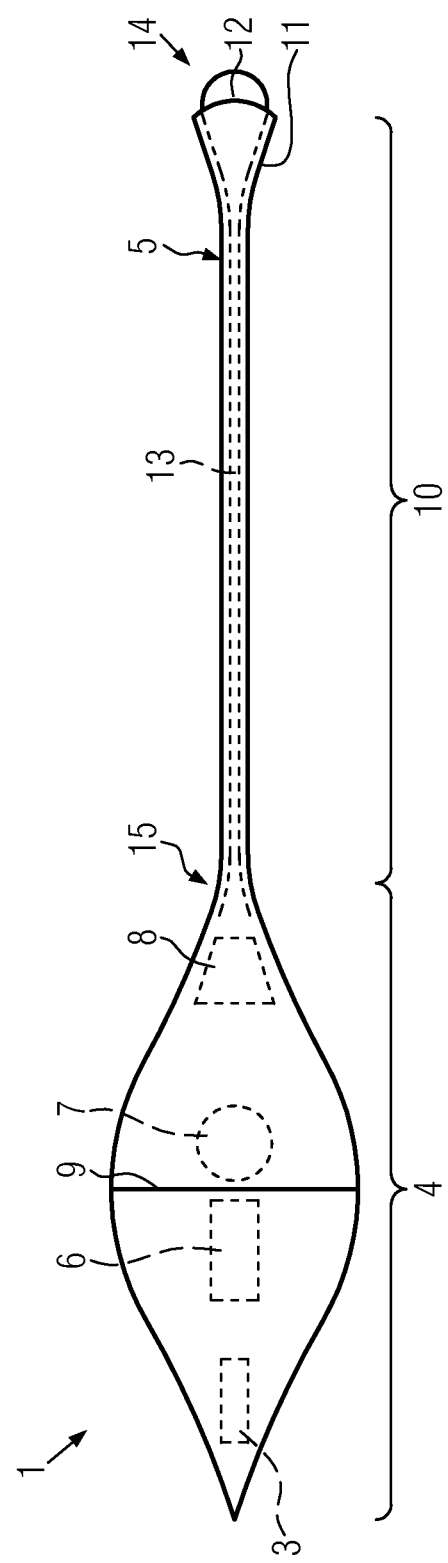
FIG. 1 shows a plan view of a first embodiment of the inventive device.

The front housing section may be formed rod-shaped, arrow-shaped or in a knife-like manner in order to facilitate insertion thereof into the foodstuff. FIG. 1 shows the front housing section designed like a lancet. To facilitate the replacement of the battery 7 and the maintenance of the electronic components, the housing can be divisible along a parting line 9.

The divisibility of the housing offers the possibility to make the various housing sections of different materials. This may in particular allow making the outer housing section of a mainly temperature-resistant, but possibly also insulating material. Insulation may be provided at the separation point of the housing sections in order to reduce, or even to prevent, the heat transfer between the housing sections.

The housing 5 also has a rear, second housing section 10, which during the preparation can remain outside the foodstuff 2. At least this rear housing section is made of a fireproof material, especially metal, preferably titanium. Of course, the entire housing can be made uniformly of a fireproof material.

At the rear end of the rear housing section, a grip 11 is provided, which is to allow insertion of the device into the foodstuff and also its removal. At least one visible status indicator 12 is located there, which is optically connected by one or more optical fibers 13 arranged within the housing to the temperature indicator 8. The temperature indicator 8 can be formed, for example, as one or more LEDs. They and thus also the status indicator 12 indicate the operating status of the device (On/Off). Furthermore, by means of the analyzing unit, the temperature indicator 8, but also the status indicator 12, the measured internal temperature of the foodstuff can constantly be represented by appropriate signals, in particular light signals.

This can be performed either by different colors or light interruptions, etc. It is conceivable to signal not only the reaching of a predetermined target temperature but the overall temperature profile.

This can be done, for example, by the arrangement of different, e.g., adjacent LEDs, each representing a temperature section. In this way, the progress of the preparation can be seen and the period remaining to reach the target temperature can be determined.

The target temperature can be pre-set or adjusted by means of the control and/or analyzing unit. It is basically conceivable, for example, to pre-set the inventive device, for example, for a particular foodstuff, e.g., grilled meat and mark it accordingly. On the other hand, it is also conceivable to use a device variably for different methods of preparation, or to use it for different foodstuffs while maintaining the desired target temperature range controllable by calibration.

The light conductor or conductors 13 extend primarily from the temperature indicator 8 to the free end of the rear housing section 10 and protrude there, for example, visibly beyond it. The rear housing section may be designed rod-shaped, and as for its overall dimensions, be considerably thinner than the front housing section 4.

In the illustrated embodiment, the device has a switch 15 to switch the components of the device on and off. In the illustrated embodiment, the switch is located between the light conductor 13 and the temperature indicator 8. It can be activated by rotating the status indicator 12 within the housing or displacing it in the longitudinal direction of the housing 5.

In particular at the rear housing section 10, there can also be provided an acoustic and/or optical signal generator 14, which in cooperation with the temperature indicator 8 signals, acoustically or, for example, by vibration, the reaching of a desired temperature of the foodstuff. The achievement of the pre-set target temperature can be indicated by means of acoustic signals, e.g., beeping, buzzing, flashing, or by mechanical signals, such as vibration.

The inventive device is simple and easy to use. Before the start of the preparation, it is inserted with its front housing section 4 into the foodstuff and remains there during the preparation. The device is put into operation by means of the switch 15. By means of the control and/or analyzing unit 6, a desired target temperature is pre-set. During the preparation, the temperature sensor 3 continuously measures the temperature. The analyzing unit 6 transmits signals from the sensor 3 to the temperature indicator 8, which passes the temperature value to the status indicator 12, for example, through one or more fiber optics.

The outer housing section 10 remains outside of the foodstuff during preparation, as shown in FIG. 2. At least this housing section is made of high-strength material so that this housing section, but also the parts of the device located therein, are temperature resistant. Upon reaching the desired target temperature, the preparation of the foodstuff is discontinued, the device is removed from the foodstuff and switched off.

FIG. 3 shows a second embodiment of the inventive device 1 in sectional view. Corresponding parts are denoted by the same reference numerals. The inventive device 1 has a mainly cylindrical housing cross-section, wherein at the front end of the housing 5 there is provided a tapered tip 23 and at the rear end there is provided a grip 11. The latter has an increased width orthogonally to the direction of longitudinal extension 11. The tip 23 and the grip 11 may be formed separately and be connected with the tube 16, in particular by means of a press fit, wherein in alternative embodiments, a threaded connection, adhesive connection or the like may be provided.

The device is inserted with the tip 23 into a foodstuff 2, in particular in the form of a steak, and is pushed in so far that a large part of the tube 16 or the entire tube 16 is located within the foodstuff 2. Only a rear section of the device 1—called the second housing section 10—protrudes from the foodstuff 2, while a front section of the device 1—referred to as the first housing section 4—is arranged within the foodstuff 2.

The first and second housing sections 4, 10 are not necessarily defined by different components of the housing, but only by the depth of penetration. Generally, however, it is true that the grip 11 substantially forms the second housing section 10, because it remains at least largely outside of the foodstuff 2. The grip 11 forms in particular a stop, which comes into contact with the foodstuff, when the device 1 was inserted into the foodstuff. The housing tube 16, and in some embodiments also the grip 11 and/or the tip 23, are made from food-grade stainless steel in order to exhibit the necessary resistance with respect to heat, detergents and mechanical stress.

On the second housing section 10, a status indicator 12 is provided, which indicates to the user perceptible, especially visible, information regarding at least one degree of doneness, in particular information relating to various predetermined temperature conditions. In particular, the status indicator 12 is formed by an opening in the rear section of the grip 11. This opening is primarily formed concentric with the tube 16. The opening for the status indicator 12 can be covered in particular by a transparent or translucent window. Alternatively, the entire grip 11 can be designed as a translucent or transparent element.

The status indicator 12 thus allows a signal, e.g., a light, sound or haptic signal, to be transmitted from a temperature indicator 8 located in the first housing section 4 to the second housing section 10, and makes it perceptible outside of the foodstuff 2.

For example, the temperature indicator 8 can consist of a sound generator, in particular a piezoelectric sound generator, or can comprise a sound generator. Its acoustic signal can be passed by a sound conductor, not shown in the figures, through the first housing section 4 and through the second housing section 10 from the foodstuff 2 so that it is clearly audible.

It is thus possible to provide an autonomous device 1 for detecting the internal temperature of the foodstuff 2, which can remain in the foodstuff 2 during the preparation, because a heating of the second housing section 10 is not critical, and the first housing section 4 is arranged within the foodstuff 2, and is thus protected by the foodstuff 2 from excessive temperatures.

The self-sufficiency of the device means that, in contrast to other devices, continuous detecting of the internal temperature of a foodstuff does not require that the device be combined with an oven or a separate remote means of display in order to allow temperature monitoring. In particular, the autonomous device has its own independent power source and its own display, and thus requires neither a separate display and data line, nor a power cord. Furthermore, the autonomous device comprises an analyzing unit, which can monitor a temperature condition.

In particular, in addition to temperature and/or status indicator, the device 1 can still have a means of transmission with which information, in particular the temperature and/or the temperature condition that were determined by the analyzing unit 6 may be transmitted to a separate display device. This makes possible not only the representation of the temperature condition on the second housing section 10, but also a representation of this and other information on another display device, which is located, for example, outside of a grill. This display device may also indicate further information, such as the remaining cooking time, the actual temperature, the target temperature, etc. Nevertheless, the device can also be used independently without a means of transmission and said external display device.

In the following text, the internal structure of the device 1 is described with reference to FIG. 3. At the front end of the device 1 in the direction L of the device 1, the tip 23 is provided, which at its rear end comprises a recessed area made to measure to the wall thickness of the tube 16, which area is pressed by means of a press fit into the interior of tube 16. To allow the necessary flexibility for the press fit, this area is designed in particular as a hollow cylinder, and may further comprise an outer groove 24 in the circumferential direction.

A spring 17 is arranged within the tip 23 in an overlapping area with the tube 16, whereby the spring 17 extends in particular into the hollow cylindrical section of the tip 23. On the one hand, it braces to each other the components that are sequentially arranged in the longitudinal direction L in the interior of the tube 16, and on the other hand, it provides a defined electrical contact between a voltage source 7 and the tip 23 or the tube 16, respectively. The voltage source 7 is for example a battery, which in particular has an outer diameter that substantially corresponds to the inner diameter of the tube 16 so that the battery can be inserted principally snugly into the tube 16. In particular, as a voltage source 7 there is proposed a lithium-ion battery, which advantageously has a capacity of about 25 mAh up to about 50 mAh. The entire circumferential surface of the battery 7, and its front end facing in the direction of the tip 23 form the positive pole of the battery so that a contact is formed with the inner wall of the tube 16 and via the spring 17 with the tip 23.

At its opposite, rear end, the battery 7 has a protruding electrical pin contact 18, which forms the negative pole. On it is mounted a clip contact 19 of a circuit board 20. Thus, an electrical connection between the voltage source 7 and the circuit board 20 is made possible, where the latter is additionally supported by the pin contact 18.

For this purpose, the pin contact is arranged primarily centrally with respect to the tube 16 and the voltage source 7 so that the clip contact 19 of the circuit board 20 is also mounted substantially centrally in the tube 16. The electrical connection of the circuit board 20 to the positive pole of the voltage source 7 is made possible by an elastic electrical contact 21 that is provided on the circuit board 20 and that connects the circuit board 20 with the tube 16. The tube 16 is connected to the positive pole either via the tip 23 and the spring 17 and/or directly over the circumferential surface of the voltage source 7. The electrical contact 21 is formed in particular as a radially outwardly resiliently biased, metallic contact element.

As can be seen in the sectional view A-A in FIG. 4, the circuit board 20 touches with its side walls against the inner wall of the tube 16, wherein normally no electrical contact is provided through this mechanical connection.

On the circuit board 20 there are arranged a plurality of electronic and electrical components, which are explained below. First, there is located thereon at least one temperature sensor 3, which is positioned substantially centrally in the lateral direction in order to detect the temperature of the housing primarily by heat conduction through the tube 16 to the circuit board 20 up to the temperature sensor 3. In order to improve the temperature transmission from the housing 5 to the circuit board 20, i.e., from the tube 16 to the circuit board 20, in particular the side surface of the circuit board 20 adjacent to the tube can be coated with copper. The fact that the material of the tube 16 primarily has a lower thermal conductivity than the material provided on and in the circuit board, particularly copper, prevents the temperature sensor 3 from determining local temperature peaks on the tube 16, which could lead to an incorrect measurement.

Instead, an integral temperature measurement takes place over a section of the housing, because the tube 16 allows a certain delay and equilibration of temperatures touching it. However, the temperatures present at a section of the housing are conducted by the relatively good conductivity of the circuit board 20, in particular through the copper coating, to the temperature sensor 3. A possible material for the tube 16 with a suitable lower temperature conductivity than copper is, for example, stainless steel or plastic.

Furthermore, there can also be provided another temperature sensor 3 distanced from the first temperature sensor in the longitudinal direction L so that the integral temperature measurement is possible over an even larger area of the housing, i.e., of the tube 16. The at least one temperature sensor 3 can be designed as a temperature-variable electrical resistor, which is integrated in a resistance bridge circuit so that the change of its resistance due to temperature change, a different voltage on it or on a constant reference resistor can be measured.

The at least one temperature sensor 3 can be connected to the analog input of a digital microcontroller, which preferably forms the analyzing unit 6. The analyzing unit 6 measures, mainly continuously in discrete intervals, the voltage present at its analog input, converts it into a digital signal, and stores or analyzes the measured temperature in a temperature condition. In particular, previous temperature values can be stored in the analyzing unit 6 in order to determine a temperature profile, or to determine the gradient of the temperature development. In the analyzing unit 6 is stored at least one temperature condition, whose attainment causes that the analyzing unit 6 to send a signal via a temperature indicator 8, for example, in the form of an LED.

The temperature indicator 8 is arranged in particular on a rear end 25 of the circuit board 20 in the longitudinal direction L. This is the reason why the light signal emitted by the temperature indicator 8 is directed at least partially toward the second housing section 10, and therefore is visible on the latter, in particular on the status indicator 12.

In order to improve the visibility of the light signal, i.e., to better conduct the light generated by the temperature indicator 8 in the direction of the status indicator, in particular a light conductor 13 may be provided, e.g., in the form of a glass element. The light conductor 13 is substantially cylindrical and has a diameter which is slightly smaller than the inner diameter of the tube 16. In order to fix the light conductor 13 in the tube, a sealing or fastening element 22 is provided near to or at the end of the tube 16 between the light conductor 13 and the tube 16. The sealing or fastening element 22 has the dual function of mounting the light conductor and preventing the penetration of liquid into the tube 16. The mounting of the light conductor 13 in the sealing and fastening element is in particular a cantilever mounting, wherein the front end of the light conductor 13 only connects to the circuit board or to the luminous element 8. The rear end of the light conductor 13 is the status indicator 12.

On the circuit board, there is further arranged a switch 15, which makes possible the activation of at least the analyzing unit 6, and thus permits an activation of the electronic and electrical components that are read off or controlled by the analyzing unit, namely the at least one temperature sensor 3 and the temperature indicator 8. The switch 15 is in particular designed as a reed relay so that a magnet guided past the device 1 in the area of the switch 15 allows activation of the switch 15.

The mounting of the inventive device according to FIG. 3 occurs as follows. First, the tip 23 is pressed into the tube 16, and the spring 17 is introduced through the rear end of the tube 16. Then, the voltage source 7 is introduced, together with the circuit board 20 that is slipped on it, into the tube 16, and finally the light conductor 13 together with the sealing and fastening element 22 are introduced. Thus the individual components are moved to the front end of the tube to the tip 23, whereby they are held in contact with each other by the spring 17. Finally, the grip 11 is pressed onto the rear end of the tube 16 so that the components are fixed inside the tube 16. In particular, for this purpose the grip 11 can comprise a cylindrical recess 26, which receives the rear part of the light conductor 13 and forms a limiting flange in the area of the status indicator 12 to prevent the light conductor 13 from exiting through an opening for the status indicator 12. Alternatively, the grip 11 can be provided with a transparent or translucent section so that the grip 11 terminates the tube 16 at its rear end and the sealing and fastening element 22 is unnecessary with respect to the sealing effect.

The electrical circuit of the inventive device 1 in this embodiment can in particular be designed as follows. The battery 7 is connected to a supply input of the analyzing unit 6 in the form of a microcontroller. In addition, a capacitor is arranged at this connection, which is connected to the ground to filter out high-frequency noise signals. The switch 15 in the form of a reed relay is connected via a capacitor to a signal input of the microcontroller, which wakes the microcontroller from a "deep sleep" mode and thus sets it in operation.

The supply voltage for the switch 15 is provided through a resistor from the battery 7. The temperature sensor 3 is formed as a temperature-variable resistor and is connected together with a constant resistance in the form of a voltage divider. The variable voltage tapped off at the voltage divider is connected to an analog input of the microcontroller, and is converted by an A/D converter in the microcontroller into a digital signal. In digital sampling intervals, the temperature signal from the temperature sensor is determined by the microcontroller 5, and analyzed in a temperature condition, wherein, depending on the attained temperature condition, an output of the microcontroller 6 outputs a corresponding supply current via a series resistor to an LED, which forms the temperature indicator 8.

The reaching of the temperature conditions, or the reaching of various temperature conditions, time conditions or operating conditions can be represented by a corresponding signal of the temperature indicator 8, in particular by flashing of the LED that forms the temperature indicator 8. For example, an actuation of the reed relay 5 can be signaled by a short higher-frequency flashing or another suitable signal, e.g., an acoustic signal so that the user knows that the device 1 is now ready. Then there occurs a slow flashing or acoustic signal, which indicates the continuous acquisition of the internal temperature of the foodstuff. Once an early-warning temperature is reached, the flashing or the acoustic signal increases in frequency. When a predetermined temperature has been reached, which requires turning off the heat supply, a high-frequency flashing or acoustic signal is triggered, whereupon the user no longer heats the foodstuff and turns off the heat supply.

In a so-called resting period, the temperature in the foodstuff 2 evens out, wherein in this process in particular the internal temperature can still continue to rise. Once the desired internal temperature is reached, the high-frequency flashing or acoustic signal is turned off, and the user therefore recognizes that the food is now ready. Alternatively or in addition to determining the resting period by means of a temperature condition, a time condition can also be set. In particular, a minimum time for the resting period can be set, in particular when the temperature, which should be present at the end of the resting period, has already been exceeded. Furthermore, a maximum time for the resting period can be set, after which the end of the resting period is displayed, even if the desired temperature has not achieved in the resting period.

In particular, the grip 11 can be designed concave in the section of the status indicator so that the grip 11 reflects the light or other signals, for example, an acoustic signal, and thus the signal reproduced on the status indicator is more distinguishable.

The device 1 can comprise in the central section of the tube 16 a predetermined breaking or separation point 27 in order to allow removal of the battery 7 in the case of the disposal of the device 1. This point 27 can be embodied in particular by a screwed notch. Alternatively, the grip 11 or the tip 23 can be temporarily mounted on the tube so that the battery 7 can be removed or replaced.

Furthermore, the tip 23 can comprise, in its section that is introduced into the tube 16, a groove 24 which allows, with a corresponding locking element in the tube 16, an engagement of the tip 23 so that the tip 23 is secured in the tube 16.

In the determination of the temperature conditions, in particular the temperature and also the temperature gradient can be considered because the latter provides an indication of the development of the temperature over time. At a high temperature gradient a high heating rate is assumed so that it can be assumed that a considerably higher temperature is present in the outer regions of the foodstuff than in the inner region, so that even when the heat supply is cut off, a further increase of the temperature inside the food still takes place due to the heat conduction in the foodstuff. Thus, the temperature condition can be determined with respect to a value that corresponds to a weighted sum of the temperature and the temperature gradient.

In particular, the at least one temperature condition can be adjusted by the user. For this purpose, it is possible, for example, to provide a multiple actuating capability of the switch 15, wherein switching occurs cyclically by different temperature conditions. Alternatively, a setting of the temperature condition can be performed by rotating or moving the housing parts of the device.

The magnetic activation of the switch 15 in the form of a reed relay can occur in particular in that a magnet is integrated in a storage means so that when removing the device from the storage means, the device is automatically activated. The storage means can be in particular a box, a holder or a pouch.

Alternatively to a reed relay as a switch 15, there can also be provided a spring made of a shape memory material (e.g., nitinol), which greatly expands when heated, and thus closes a contact. This can for example occur in that the corresponding spring moves the light conductor 13. Alternatively, a bimetallic strip can be provided that closes a contact when heated.

Alternatively to the switches 15 described above, there can also be provided an infrared sensor, which is switched on by heat-generated infrared radiation. Such sensors are in particular suitable for grill applications. The infrared circuit can be in particular transferred to the switch by the light conductor.

A vibration switch can also be provided as the switch 15 so that the device can be activated by gentle shaking.

If the housing 5 of the device is made of plastic, there can nevertheless be locally provided, in particular in the area of the at least one sensor 3 and in the second housing section, a housing section made of metal that provides the necessary heat resistance or the desired thermal conductivity.

If a plurality of temperature sensors is provided in the device, it can be advantageous to assign the sensors 3 alternately to the top and the bottom of the device to ensure the most accurate temperature measurement possible.

Advantageously, the device is permanently set to a final degree of doneness, wherein in particular different devices can be designed for different final degrees of doneness. However, it is also possible that the temperature indicator changes its color when passing through different degrees of doneness, for example, for final degrees of doneness "Rare" to "Well Done" so that different final degrees of doneness can be prepared with only one device.

The geometry of the grip 11 can in particular allow that the grip to be gripped with a puller, i.e., with a mechanical element that allows the device to be removed from the foodstuff, even if due to its temperature the device cannot be grasped directly by the user.

The entire grip can be in particular formed by a light conductor, for example, glass. This glass can be designed as either transparent or translucent, i.e., either clear or frosted glass.

In one embodiment, the entire interior of the device is filled with a particular food-grade polymer so that the components contained therein are fixed in their position. In other embodiments, the components in the device are only sequentially introduced into the tube, with no additional fastening means being required. In particular borosilicate glass is suitable for the light conductor. The sealing and fastening element 22 can be made of a preformed elastomer material. The sealing and fastening element 22 can also be formed by a pourable or sprayable polymer material, for example by local casting or spraying with polycarbonate. Furthermore, the sealing and fastening element can also be formed by a two-component ceramic adhesive on the basis of a food-grade sodium silicate.

As for the battery 7, in particular a lithium-CFx, lithium or lithium-MnO2 battery is provided.

The temperature indicator 8 is formed in particular by an LED, which at 5 to 20 mA supply current has a brightness of 140-180 micro candela. In particular, several differently colored LEDs can be arranged side by side on the circuit board, wherein the light signal emitted by the LEDs respectively is fed into the same or into a different light conductor.

The diameter of the tube 16 is preferably 4 mm to 8 mm and advantageously from 5.6 mm to 7 mm. The tube has a wall thickness of about 0.1 mm to about 0.5 mm. Thicker walls are primarily necessary for polymer materials and titanium alloys allow a very thin design of the tube wall. The total length of the device is between 60 mm and 120 mm, advantageously between 80 mm and 100 mm. Alternatively to a circular cross-section of the tube 16, also rectangular, square or other cross-sectional shapes can be used.

The light conductor 13 is usually a cylindrical element. In some embodiments, the light conductor 13 can also be conically narrowed or widened in a trumpet shape so that different space and light intensity requirements can be met. In particular, the light conductor can be widened in the area of the status indicator in order to allow for a larger status indicator. The light conductor can be inserted in particular into a flared end of the tube 16 and completely fill out and seal it. In this case the widened part of the tube 16 forms a grip 11, and an additional grip can be omitted. Between the light conductor and the end of the tube a seal is then introduced, in particular in the form of a sealing adhesive or a sealing ring. Alternatively, the light conductor can protrude beyond the tube 16 and can be conically widened so that the light conductor forms the grip. The light conductor can be fixed by gluing, by a sealing ring and/or by clips.

In the above embodiment, the heat is conducted to the temperature sensor primarily through the circuit board, but also through the air in the cavity around the circuit board. Alternatively, however, between the temperature sensor and the tube, there can also be provided a contact element, for example, in the form of a thermally conductive pad or a thermally conductive clip, advantageously made of copper.

On the housing, there can be marked in particular the location of the temperature sensor and/or the position of a possible breaking point 27 in order to facilitate the use or disposal of the device.

The device is designed such that if it is inadvertently turned on or turned on and not used, it automatically turns off again after a predetermined time, even without heating.

In one embodiment, the grip 11 can be formed as a punch molded part, wherein the light conductor has at its rear end a flange so that, when it is carried through a central opening in the punch molded part and is fastened in the tube, the light conductor attaches the grip. In particular, the light conductors can be fixed in the tube with a press fit or a thread.

The device may be provided with an electrical charging device, which allows charging of the voltage source. The charging device can be a connection for a charging cord. Also, spaced electrical contacts on the housing of the device can be provided, which can be connected to respective supply contacts, e.g., when the device is stored in a holder.

Furthermore, the charging device may comprise an induction coil in the device, which is supplied by means of an electric field. Finally, the loading device can also be mechanically actuated so that the voltage source is charged by relative movements of the housing parts of the device or by kinetic energy, for example, introduced by shaking the device, in particular by the movement of a magnet with respect to a coil or by a piezoelectric element. Due to its rechargeability, the voltage source can be made smaller and thus the device can be designed more compactly.

The invention claimed is:

1. A device for detecting the internal temperature of a foodstuff, which comprises:
    at least one temperature sensor, which is arranged in a first housing section that can be inserted into the foodstuff,
    a second housing section adjacent to the first housing section and which can protrude from the foodstuff,
    a voltage source,
    an electronic analyzing unit, and
    a temperature indicator,
    wherein during the preparation of a foodstuff for eating, the first housing section is designed to remain within the foodstuff,
    at least the analyzing unit and the temperature indicator are located in the first housing section, and
    a status indicator for visually displaying the information from the temperature indicator is present on the second housing section.

2. The device according to claim 1, wherein the at least one temperature sensor can measure an integral temperature over at least a part of the first housing section.

3. The device according to claim 2, wherein the temperature indicator includes a signal that communicates different degrees of doneness with different colors, flashing lights or audio signals.

4. The device according to claim 1, wherein the temperature sensor is spaced apart from the inside of the first housing section.

5. The device according to claim 1, wherein a cavity is provided between the at least one temperature sensor and the inside of the first housing section.

6. The device according to claim 1, wherein the temperature indicator-is optically connected with the status indicator by at least one light conductor.

7. The device according to claim 1, wherein the analyzing unit is designed to monitor a temperature condition in dependence on the temperature gradient and/or the temperature in order to determine a degree of doneness.

8. The device according to claim 1, wherein the device includes an arrangement to identify the reaching of a first temperature condition, and the subsequent reaching of a second temperature condition or a time condition.

9. The device according to claim 1, wherein at least the analyzing unit can be activated by displacing and/or rotating the second housing part relative to the first housing part.

10. The device according to claim 1, wherein at least the analyzing unit can be activated by a magnet.

11. The device according to claim 1 further comprising two electrically conductive regions spaced apart on the first housing section which are activated by electrical bridging by means of the conductivity of the foodstuff.

12. The device according to claim 1 including a transmission means for transmitting the information that has been determined by the analyzing unit to a display device that is separate from the device.

13. The device of claim 1 wherein the first housing section and the second housing section are part of a single elongated housing which can be taken apart into two sections for access to the voltage source.

14. A method of preparing a foodstuff by a cooking process, comprising the following steps:
    a) inserting an autonomous temperature measuring device into the foodstuff so that a first housing section is arranged within the foodstuff, wherein
    at least one temperature sensor,
    an analyzing unit, and a temperature indicator are located in the first housing section, and a second housing section of the device adjacent to the first housing section protrudes from the foodstuff;

b) continuously measuring the internal temperature of the foodstuff during preparation with the device, maintaining the first housing section within the foodstuff during the preparation of the foodstuff;

c) checking at least one temperature condition with the analyzing unit;

d) outputting information from the analyzing unit through the temperature indicator and visually displaying the information on an indicator located on the second housing section.

15. The method according to claim 14, which comprises carrying out an integral temperature measurement over an area of the first housing section.

16. The method according to claim 15, which comprises signaling the operator of the device acoustically, optically and/or haptically that a predetermined temperature condition with respect to the foodstuff has been reached.

17. The method according to claim 14, which comprises carrying out measuring the temperature or the temperature gradient and/or the temperature, to determine whether the desired degree of doneness has been reached.

18. The method according to claim 14, wherein the device is activated by a magnet.

19. The method according to claim 14, which comprises activating the device through the electrical bridging due to the conductivity of the foodstuff by two spaced electrically conductive areas on the housing.

20. A device for monitoring the internal temperature of a food product which comprises:

A body having a first housing section adapted for remaining in place in the interior of the food product while the interior of the food product is heated to a temperature above 50 degrees C.;

A second housing section of the body adjacent to the first housing section;

A temperature measuring device within the first housing section;

An electronic analyzing unit located within the first housing section for detecting when a predetermined temperature has been reached;

A power source for the analyzing unit entirely within the first housing section; and A visual signaling apparatus in the first housing section that is in communication with a visual status indicator in the second housing section for visually signaling a user when the predetermined temperature has been reached.

21. The device according to claim 20 wherein the signaling apparatus comprises an optical device.

22. The device according to claim 20 wherein the analyzing unit can be activated magnetically.

23. The device according to claim 20 which includes apparatus for rotating one of said housing sections relative to the other.

24. The device according to claim 20 which comprises a means for transmitting information determined by the analyzing unit to a display that is separated from the device.

25. The device according to claim 20 wherein the signaling apparatus is optically connected with the status indicator by at least one light conductor.

* * * * *